United States Patent
Howey

[19]

[11] Patent Number: 6,075,682
[45] Date of Patent: Jun. 13, 2000

[54] DISKETTE LINER WITH FILM AND WEB LAYERS

[75] Inventor: Jon A. Howey, Mansfield, Mass.

[73] Assignee: BBA Nonwovens Simpsonville, Inc., Simpsonville, S.C.

[21] Appl. No.: 09/112,123

[22] Filed: Jul. 8, 1998

[51] Int. Cl.$^7$ .................................................. G11B 23/03
[52] U.S. Cl. ............................................................. 360/133
[58] Field of Search .............................................. 360/133

[56] References Cited

U.S. PATENT DOCUMENTS

| | | |
|---|---|---|
| 2,464,301 | 3/1949 | Francis . |
| 2,816,054 | 12/1957 | Howden . |
| 3,507,943 | 4/1970 | Such et al. . |
| 3,523,861 | 8/1970 | Newman et al. . |
| 3,542,634 | 11/1970 | Such et al. . |
| 3,575,764 | 4/1971 | McFarren . |
| 3,903,345 | 9/1975 | Baker et al. . |
| 3,988,519 | 10/1976 | Stoller . |
| 4,041,203 | 8/1977 | Brock et al. . |
| 4,106,067 | 8/1978 | Masuyama et al. . |
| 4,211,227 | 7/1980 | Anderson et al. . |
| 4,285,342 | 8/1981 | Mesek . |
| 4,446,189 | 5/1984 | Romanek . |
| 4,451,520 | 5/1984 | Tecl et al. . |
| 4,586,606 | 5/1986 | Howey . |
| 4,606,964 | 8/1986 | Wideman . |
| 4,610,352 | 9/1986 | Howey et al. . |
| 4,637,945 | 1/1987 | Masui et al. . |
| 4,725,473 | 2/1988 | Van Gompel et al. . |
| 4,769,733 | 9/1988 | Freeman et al. . |
| 4,803,584 | 2/1989 | Doi et al. . |
| 4,839,765 | 6/1989 | Lam . |
| 4,946,530 | 8/1990 | Lam . |
| 4,998,176 | 3/1991 | Takemae ................................. 360/133 |
| 5,060,105 | 10/1991 | Howey . |
| 5,370,917 | 12/1994 | Niitsuma ................................. 360/133 |
| 5,391,418 | 2/1995 | Strongwater . |
| 5,491,017 | 2/1996 | Todt . |
| 5,582,901 | 12/1996 | Howey ................................. 360/133 |

FOREIGN PATENT DOCUMENTS 1568404  5/1980  United Kingdom .

Primary Examiner—A. J. Heinz
Attorney, Agent, or Firm—Ostrager Chong Flaherty & Onofrio, P.C.

[57] ABSTRACT

A nonwoven media wiping material is provided by a thermal point bonding process which comprises the steps of combining a carded web of predominantly textile-length thermoplastic fibers having a higher melting temperature and a polymeric sheet having a lower melting temperature, and applying heat and pressure to the combination of film and fiber layers through thermal calendering. The polymeric sheet melts and becomes bonded to the carded fibers in discrete points to provide a soft and lofty outer media contacting finish.

19 Claims, 3 Drawing Sheets

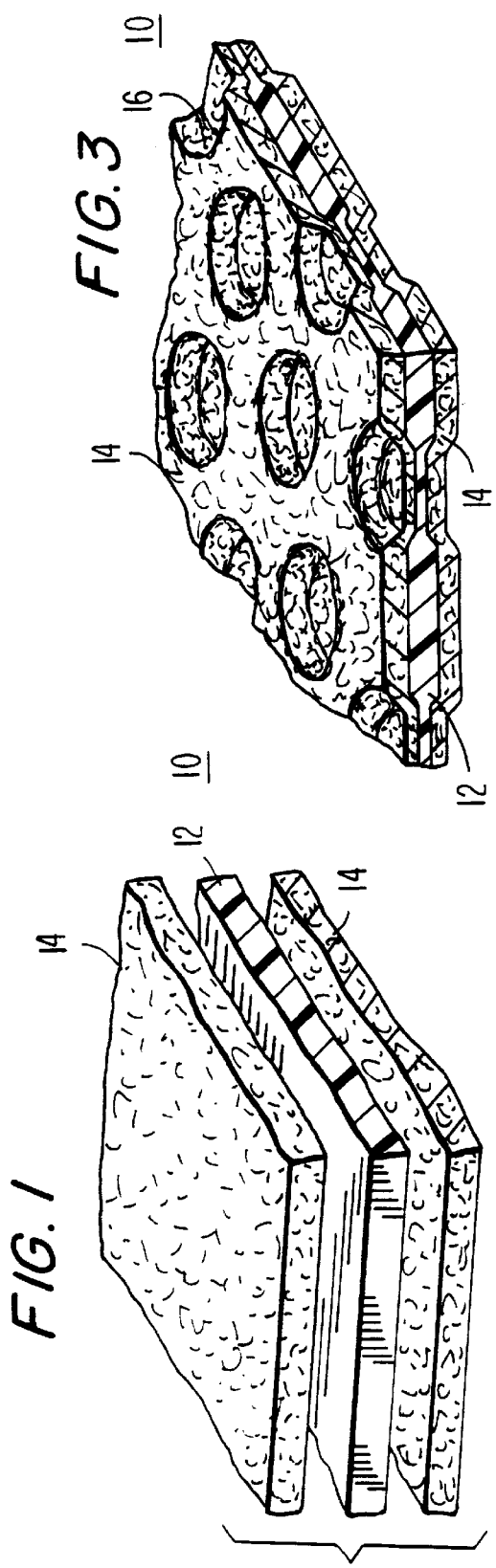

DISKETTE LINER WITH FILM AND WEB LAYERS

FIELD OF THE INVENTION

This invention generally relates to a nonwoven fabric for use as a liner or wipe for the magnetic medium in a computer diskette. More particularly, it is concerned with a film and nonwoven laminate formed by thermal calendering.

DESCRIPTION OF THE PRIOR ART

Conventional nonwoven liners for use in magnetic media diskettes comprise fibrous layers of unitary and blends of cellulosic and thermoplastic fibers. U.S. Pat. Nos. 4,586,606 and 4,610,352, both to Jon A. Howey, are representative of the state of the art. These patents disclose liner materials which include an outer media contacting layer of substantially non-thermoplastic textile length fibers which is thermally point-bonded to an inner layer of low melting point thermoplastic material. During the thermal bonding of the wipe, the low melting thermoplastic materials of the inner layer melt and bond to the non-thermoplastic fibers at discrete points which are recessed below the surface of the wipe.

Thermal bonded liners produced by this process have soft, lofty media contacting finishes, and are characterized by low levels of debris, high compressibility, low abrasiveness, dimensional stability and low surface resistivity.

The conventional liners of the Howey patents represent the industry standard and are widely used for diskette and media wipe applications. There remains, however, a need in the computer industry to reduce manufacturing costs of wipe materials, as compared to new laser disk technologies, to maintain diskettes as a viable information storage media. The diskette industry has sought to achieve cost savings by reducing material content in liners. However, it is found that such material reductions degrade the performance of liners in features, such as, cutability and stability. For example, in the production of diskettes, nonwoven liners are die cut and vacuum transferred to diskette backings, usually plastic shells. With reductions in material content, liners become porous and cannot be effectively vacuum transferred to the diskette. Further production difficulties in reduced weight liners include inadequate dimensional stability and difficulties in obtaining precise cutting of materials.

The present invention resides in the discovery that inexpensive wipe materials may be produced by thermally point bonding polymeric films to carded or unbonded webs of predominantly textile length thermoplastic fibrous materials. In particular, it is found that media contacting web materials composed of combinations of amorphous polyester binder fiber and polyester fibers provide effective wipe features. Further advantage is obtained by including cellulose fibers, such as rayon, in the media contacting material.

It is therefore, a principal object of the present invention to provide a low weight, reduced cost liner having performance features of conventional liner structures.

A more specific object is to provide a one-step cost-effective thermal bonding process for wipe materials which comprise laminates of polymeric films and fibrous materials including thermoplastic fibers and blends of thermoplastic and cellulose fibers.

SUMMARY OF THE INVENTION

In accordance with the present invention, a nonwoven media wiping material is provided by a thermal point bonding process which comprises the steps of combining a carded web of predominantly textile-length thermoplastic fibers having a higher melting temperature and a polymeric sheet or film having a lower melting temperature, and applying heat and pressure to the combination of film and fiber layers through thermal calendering. The polymeric sheet melts and becomes bonded to the carded fibers in discrete points to provide a soft and lofty outer media contacting finish.

In the preferred liner, the fibers of the carded web comprise a blend of 0–80% rayon fibers, 0–100% polyester and 0–60% amorphous polyester binder fiber. The polymeric sheet is a thin plastic film having a thickness of 0.2–2.0 mil, and preferably 0.5 mil, composed of an olefinic or other polymeric material, such as a linear low density polyethylene, polypropylene or polyester.

It is preferred to provide liners having basis weights ranging from 15–40 grams/yd$^2$ (gsy). The liner can have 10% to 40% of its outer surface bonded and a void volume of approximately 90% for entrapment of dirt and debris.

The outer carded web may be combined with the polymeric sheet to form a bi-laminate product in which the polymeric sheet is bonded to inner panels of a conventional diskette. It is preferred to provide tri-laminate liners in which two or more outer carded webs are combined with an intermediate polymeric film.

In one preferred example, a thermal spot bonded liner is composed of a 0.5 mil polypropylene film, and carded web(s) including 40% rayon fiber at 1.5 denier, 1 9/16 inch staple length, 20% polyester fiber at 1.5 denier, 1.5 inch staple length, and 40% amorphous polyester binder fiber at 3.0 denier, 1.5 inch staple length. Alternatively, the carded web in this liner may include 60% polyester fiber at 1.5 denier, 1.5 inch staple length and 40% amorphous polyester binder fiber at 3.0 denier, 1.5 inch staple length. The resulting liners exhibit dimensional stability and satisfactory wipe characteristics.

Other objects, features and advantages of the present invention will be apparent when the detailed description of the preferred embodiments of the invention are considered in conjunction with the drawings which should be construed in an illustrative and not limiting sense as follows:

BRIEF DESCRIPTION OF THE DRAWINGS

FIG. 1 is a schematic fragmentary perspective view, of an unbonded tri-laminate diskette liner of the invention including nonwoven outer layers and an intermediate polymeric layer;

FIG. 2 is a cross-sectional view of a thermal bonded tri-laminate liner material of FIG. 1;

FIG. 2A is a cross-sectional view of a thermal bonded bi-laminate liner material including nonwoven and polymeric layers;

FIG. 3 is a schematic view of a bonded diskette tri-laminate liner of the invention;

DETAILED DESCRIPTION OF THE INVENTION

Figure 4:
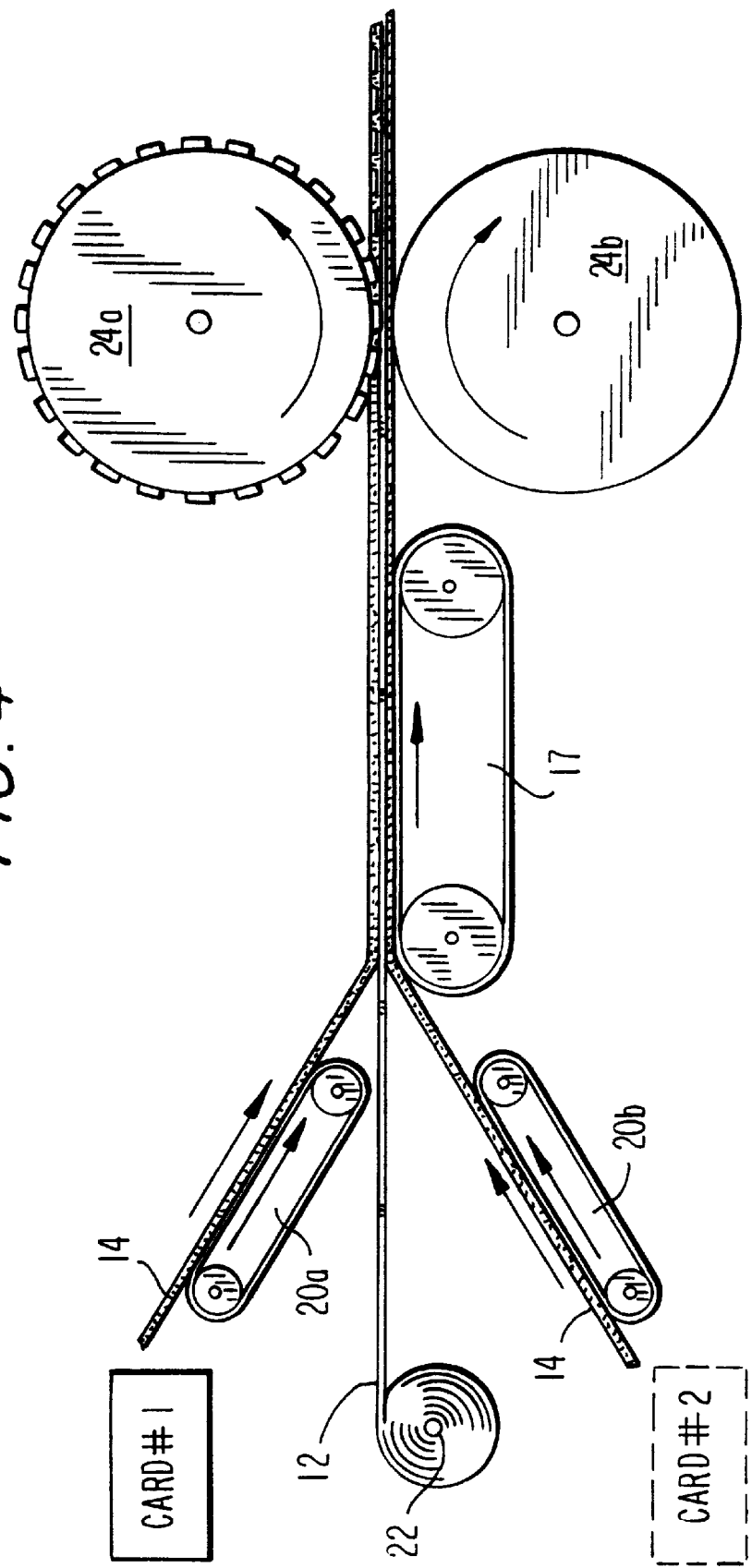
FIG. 4 is a schematic view of a process line for the manufacture of diskette liners in accordance with the invention.

Referring to the drawings, FIG. 1 shows an unbonded layered fabric 10 of the invention which includes an inner thermoplastic film layer 12 and outer media contacting layers 14. The outer layers comprise carded web materials composed of substantially textile length thermoplastic fibers or a combination of thermoplastic and cellulosic fibers. The thermoplastic film 12 of the inner layer has a lower melting temperature than fibers of the outer layers 14. The film and web layers are bonded together at discrete bonding points in a one-step heat calendering process. During the bonding process sufficient heat is used to cause a melting or softening of the low melting film.

Although FIG. 1 illustrates a tri-laminate liner, it should be understood that additional or fewer layers of film and web materials may be employed in liners of the invention. In particular, the outer layers 14 may be composed of a plurality of individual webs having similar fiber compositions which are layered together depending on the desired weight and thickness in the finished liner.

FIGS. 2 and 2A schematically illustrate cross-sections of alternative tri and bi-laminate liner structures of the invention. Both embodiments employ outer media contacting layer 14 laminated to thermoplastic film 12. The polymeric film 12 melts and becomes bonded to the carded fibers in discrete points 16 to provide a soft and lofty outer media contacting finish.

The fibers of the outer layers 14 preferably comprise a blend of 0–80% cellulosic fibers, such as viscose rayon fibers, and 20–100% polymeric fiber. Typical rayon fibers which have application in the liner 10 have deniers in the range of 0.5 to 6.0 and textile lengths of 0.5 to 4.0 inches. A preferred rayon fiber has a 1.5 denier, with a staple length of approximately 1.562 inches, manufactured by Courtaulds Fibers, Inc., Axis, Ala., product designation 1099. Other cellulosic fibers which may be used in the liner include solvent spun cellulosics, cotton, wool or other natural or synthetic fibers.

Preferred polymeric fibers for use in the outer layers include 0–60% polyester fiber and 0–60% amorphous polyester binder fiber. These polymeric fibers are characterized by high strength, and provide a soft finish for media wiping applications. The preferred polyester and polyester binder fibers have 0.5 to 6.0 denier and staple length of 0.5 to 4.0 inches. For example, a suitable polyester fiber is Type 472 manufactured by Wellman, Inc., Shrewsbury, N.J. This fiber has 1.5 denier, 1.5 inch staple length, semi dull luster, round cross-section and is optically brightened. An example of a suitable polyester binder is Type 259 manufactured by Hoechst Trevira, Charlotte, N.C., having a 3.0 denier, 1.5 inch staple length and semi dull luster.

Preferred polymeric films which may be used as the inner thermoplastic film layer 12 include, but are not limited to, olefinic films, and most preferably polypropylene. The films may have a caliper which varies from 0.2 to 2.0 mil, most preferably 0.5 mil, and corresponding weights which vary from 4 to 40 gsy, and preferably 10 gsy. In one preferred embodiment, the film layer comprises a material which has a melting temperature of at least 35° C. lower than the melting temperature of fibers of the outer carded webs. However, films having melting temperatures from 0° C. to 35° C. lower than the fiber layers' melting temperatures may also be used. Table I shows several examples of preferred films.

TABLE I

| Film Type | Manufacturer | Film Grade # | Nominal Film Thickness (mils) |
| --- | --- | --- | --- |
| polypropylene | Huntsman Packaging Co., Salt Lake City, UT | XP-9012 | 0.5 |
| polyethylene | Exxon Chemical Co., Buffalo Grove, IL | XEMB-741 | 0.5 |
| polyester | E.I. DuPont De Nemours & Co., Wilmington, DE | Mylar LB48 | 0.48 |
| polyester | Rhodia, Cranberry, NJ | 10.10 | 0.48 |

In a preferred embodiment of the invention, the liner 10 has weight in the range of 15–40 gsy, and preferably 30 gsy. A desired product can be made having a weight from 15–40 gsy using 60% polyester fibers and 40% polyester binder fibers, of the types identified above, in the carded webs, and a 0.5 mil polypropylene film, such as type XP-9012, manufactured by Huntsman Packaging Co. The aforementioned polyester and polyester binder fibers have a melting point of about 250° C., and the polypropylene film has a melting point of about 170° C. In accordance with the invention, the liner 10 is fabricated by a thermal calendering technique which employs embossing rolls. Preferred thermal calendering processes useful for producing the liner materials of the invention are disclosed in the following U.S. Patents which are incorporated herein by reference: U.S. Pat. Nos. 3,507,943 and 3,542,634 to J. J. Such et al., U.S. Pat. No. 4,586,606 to Howey and U.S. Pat. No. 4,610,352 to Howey et al.

FIG. 4 is a schematic illustration of a process line for the manufacture of nonwoven fabric as a continuous roll product. The fibers of the outer layers are carded at card stations #1 and #2 and fed on card conveyors 20a, 20b, respectively, for fibrous webs 14. The inner thermoplastic film 12 is unwound from an unwind stand 22 and fed in superposed relation between the two carded webs on the card conveyors, and the composite of plastic film enclosed between two carded webs is fed by conveyors 20a, 20b to hot calender rolls 24a, 24b to be thermally bonded.

The preferred process line employs a single engraved roll 24a and solid roll 24b, although dual engraved rolls may be used. It is preferred to employ calender engravings which provide circular shaped recessed bonds, best shown in FIG. 3, however, other bond shapes may be used. Conventional spot-bond patterns include, for example, circular or oval, dot, and diamond which may be varied in size.

The calender rolls 24a, 24b are heated to a temperature of 93° C.–315° C. (200° F.–600° F.), preferably 149° C.–204° C. (300° F.–400° F.), and apply pressure in the range of 50–500 pli, preferably 210 pli. The carded webs 14 and polymeric film 12 are processed at a speed of 50–700 fpm, preferably 200–400 fpm.

According to the invention, the thermal calendering process parameters of heat, pressure and speed, and calender engraving patterns, are varied in order to isolate and recess bonds in the liner 10 away from the surface of the fabric. As best shown in FIG. 3, the inner layer 12 of low melting polymeric film melts, adheres and encapsulates fibers in the outer layers 14. The liner 10 can have 10% to 40% of its outer surface layers 14 recess bonded to the film 12, and a void volume of approximately 90% in the outer liner layers for entrapment of dirt and debris. This selective recess bonding provides a liner 10 wherein a substantial portion of the fibers in the outer layers 14 are unbonded to provide a soft and lofty liner finish. Different variations utilizing other types of plastic films and polymeric materials can produce liner materials using the same basic concept of the invention. Thus, the nonwoven layers may include fibers other than polyester, for example, olefinic fibers, polyamides (such as, nylon), polyolefin and acrylic fibers, cellulosic fibers (such as rayon, lyocel and cotton), and bi-component and conjugate fibers. It is also within the scope of the invention to provide liners made using predominantly cellulosic outer layers.

Figure 5:
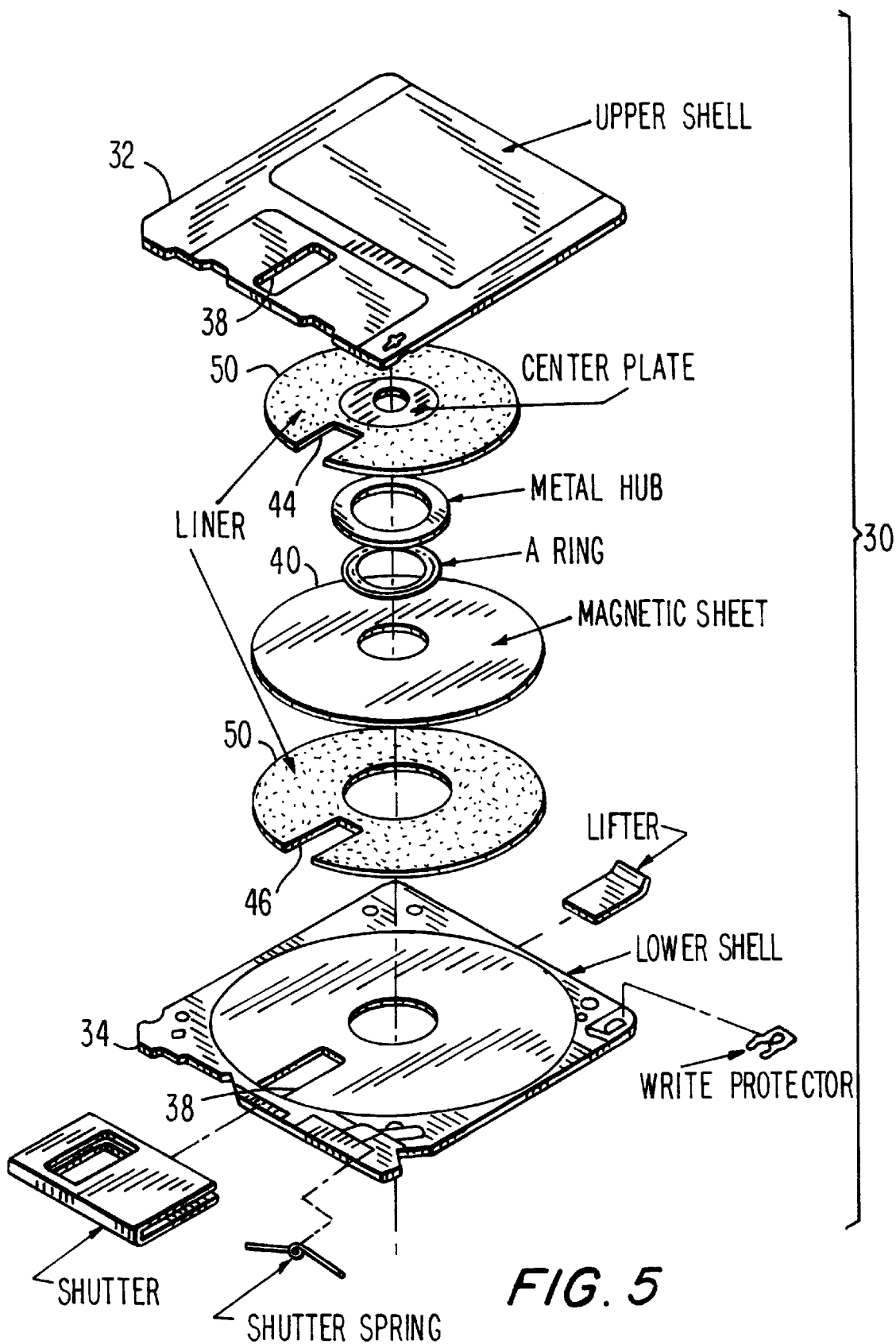
FIG. 5 is an exploded perspective view of a typical disk cartridge employing the thermally bonded nonwoven diskette liner of the invention.

Although it is most preferred to use polypropylene film as the inner layer in liner 10, desirable liners can be made which employ polyester or polyolefinic based films such as polyethylene. FIG. 5 shows an exploded perspective view of a conventional diskette cartridge to illustrate a preferred use of the liner of the invention. The diskette cartridge 30 has an upper member 32 and a lower member 34. The disk 40 can be rotated by a mechanism which can, for instance, include a rim drive apparatus which drives a disk rim to rotate the disk 40. Alternatively, the disk 40 can include a hub for engaging a suitable hub drive mechanism disposed within the disk drive apparatus. One or both of the upper and lower members 32 and 34 of the disk cartridge 30 includes a cutout 38 for providing a read/write head access to the disk 40.

Liners 50 are provided on one or both sides between the disk 40 and the upper and lower members 32 and 34 of the diskette 30. The liners 50 may be formed at least substantially co-extensive with the recording surface of the disk 40 and with cutouts 44 and 46 similar to the cutouts 38 in the upper and lower members 32 and 34, respectively, for mating with the holder cutouts 38 and allowing for read/write head access therethrough. The liners 50 are fixed with respect to the cartridge 30 to avoid the possibility that they might become displaced and inadvertently cover the read/write head access through cutouts 38. The liners 50 are secured to the upper and lower members 32 and 34 in alignment with the cutouts 38, for instance, by employing thermal spot welding or ultrasonic spot welding techniques. It will be understood that diskette cartridge designs other than the one illustrated in FIG. 5 may be used in the invention.

The following examples demonstrate preferred fabric compositions and the improved characteristics for liners of the invention.

EXAMPLE 1

A thermally spot bonded nonwoven was prepared using a three layered construction of fibers/film/fibers. The outer surface layers were substantially identical fiber blends composed of 40% rayon fiber at 1.5 denier, 1 9/16 inch staple length, 20% polyester fiber at 1.5 denier, 1.5 inch staple length and 40% amorphous polyester binder fiber at 3.0 denier, 1.5 inch staple length. The outer fibrous layers were laminated to an inner layer of 0.5 mil polypropylene film.

The bottom layer of fibers was carded and the fibrous web deposited on a moving conveyer. The film was laid on top of the bottom fibrous web and then the top fibrous web was deposited on top of the film. This three layered system was continuously conveyed to a hot calender where it was thermally spot bonded. The bottom calender roll had a smooth surface and the top calender roll was engraved with a dot type pattern at approximately 22% raised or bond area. The bottom calender roll was heated to a temperature of 165° C. and the top calender roll heated to a temperature of 173° C. The top and bottom rolls were pressed together to form a nip at approximately 210 pli where the three layered structure was passed through at 75 feet per minute.

The resulting fabric has a weight of 29 gsy, a thickness of 10.5 mils at a load of 4.4 g/cm$^2$, a machine direction ("MD") strip tensile of 2.9 lbs/in, and a cross-direction ("CD") strip tensile of 1.0 lbs/in. The fabric is capable of being compressed approximately 28% in thickness to 7.6 mils at a load of 186 g/cm$^2$.

EXAMPLE 2

A thermally spot bonded nonwoven was prepared in the same manner as Example 1 except the fibrous layers were composed of 60% polyester fiber at 1.5 denier, 1.5 inch staple length and 40% amorphous polyester binder fiber at 3.0 denier, 1.5 inch staple length. As in the previous Example, the inner layer was a 0.5 mil polypropylene film.

The resulting fabric has a weight of 30 gsy, a thickness of 12.8 mils at a load of 4.4 g/cm$^2$, a MD strip tensile of 3.6 lbs/in, and a CD strip tensile of 1.4 lbs/in. The fabric is capable of being compressed approximately 39% in thickness to 7.8 mils at a load of 186 g/cm$^2$.

In comparing the performance of the liners of the Examples, it is found that the Example 1, which has rayon surface constituent fibers, is typically superior to the Example 2 100% thermoplastic liner. The Example 1 liner produces more debris in use. Both liners, however, are satisfactory and meet industry requirements. It will be recognized that the selection of the preferred liner is, in part, a function of cost considerations. The Example 2 liner provides the most economical approach for the industry and is suitable for general diskette uses.

Diskette certification tests were conducted to demonstrate the cleaning effectiveness of the invention liners compared to existing standards. Certification tests were performed for the liners of Examples 1 and 2 for comparison with conventional liners marketed by International Paper Company, Veratec Division, under product designations 9900 and 9188. Both of the conventional Veratec liners are multi-layer point bonded laminated structures. Veratec 9900 liner has an overall fiber blend of 80% rayon and 20% nylon 6 with surface layer of 100% rayon. The Veratec 9188 liner comprises 50% rayon and 50% polyester fibers. Diskette liners of this type are disclosed in U.S. Pat. Nos. 4,586,606 and 4,610,352.

For the certification tests, two hundred diskettes were made with each of the foregoing liners. An appropriate lifter was selected for each type of liner, so that the average running torque with the head up was between 0.20 and 0.25 ounce-inches of force. Each diskette was tested for missing bits at a 60 percent clip level and zero retries. For this test, a missing bit occurred when the base to peak voltage amplitude of any flux transmission was less than 60% of the average base to peak level of the track under test. Table II sets forth certification test results.

TABLE II

| Liner Type | Fibers on Surface (%) | YIELD (%) (diskettes w/no missing bits) | Torque (ounce-inches) (running torque w/head up) |
| --- | --- | --- | --- |
| Ex. 1 | 60 rayon 40 polyester | 92.5 | 0.21 |
| Ex. 2 | 100 polyester | 92.5 | 0.25 |
| Veratec 9900 | 100 rayon | 92.5 | 0.25 |
| Veratec 9188 | 50 rayon 50 polyester | 89.5 | 0.23 |

The certification test results demonstrate that liners of the present invention have similar cleaning effectiveness to liners commonly used in the industry.

From the foregoing, it will be appreciated that the present invention addresses the need in the diskette industry for liners of reduced cost. In particular, liners are provided which comprise low cost thermoplastic film and fibrous web constitute layers. The film layer provides essentially an impermeable barrier material having effective vacuum pick-up for manufacture of the diskette. Advantage is obtained by use of outer fibrous layers which include textile type rayon, polyester and polyester binder fibers which are point bonded to the interior film layer to provide a soft and lofty media contacting surface.

Although the invention has been described with reference to certain preferred processes and examples, it will be appreciated that many other variations and modifications thereof may be devised in accordance with the principles disclosed herein. The invention and all such variations and modifications thereof within the scope and spirit of the invention are defined in the following claims.

I claim:

1. A computer diskette liner material comprising a carded web of predominantly thermoplastic textile length fibers having a first melting temperature, and a polymeric sheet having a second melting temperature, said carded web of fibers and polymeric sheet being calendered by heated calendering points of a calender roll, such that said polymeric sheet becomes bonded to said fibers only in a plurality of recessed discrete bonding points.

2. A computer diskette liner according to claim 1, wherein the second melting temperature is lower than said first melting temperature.

3. A computer diskette liner according to claim 1, wherein the second melting temperature is equal to said first melting temperature.

4. A computer diskette liner according to claim 1, wherein said carded web of fibers and polymeric sheet are calendered by heated calendering points of a calender roll.

5. A computer diskette liner according to claim 1, wherein said fibers are polyester.

6. A computer diskette liner according to claim 1, wherein said polymeric sheet is selected from the group consisting of polyester and polyolefinic based films.

7. A computer diskette liner according to claim 6, wherein said polymeric sheet is polypropylene film.

8. A computer diskette liner according to claim 1 formed as a tri-laminate having two outer carded webs and an intermediate polymeric sheet sandwiched therebetween.

9. A computer diskette liner according to claim 8, wherein said outer carded webs comprise polyester fibers, and said polymeric sheet comprises polypropylene film.

10. A computer diskette liner according to claim 8, wherein the two outer carded webs are made of the same fibrous material.

11. A computer diskette liner to claim 8, wherein the two outer carded webs are made of different fibrous material.

12. A computer diskette liner according to claim 11, wherein one outer carded web is made of a blend of polyester, polyester binder and rayon fibers.

13. A computer diskette having a flat plastic container, a nonwoven fabric liner disposed therein, and a flexible magnetic disk disposed thereon, in surface contact with said nonwoven liner, wherein the improvement comprises: a liner material including a carded web of predominantly thermoplastic textile length fibers having a first melting temperature, and a polymeric sheet having a second melting temperature, said carded web of fibers and polymeric sheet being calendered by heated calendering points of a calender roll, such that said polymeric sheet becomes bonded to said fibers only in a plurality of recessed discrete bonding points.

14. A computer diskette according to claim 13, wherein said second melting temperature is lower than said first melting temperature.

15. A computer diskette according to claim 14, wherein the second melting temperature of said polymeric sheet is at least 35° C. lower than the first melting temperature of said fibers.

16. A computer diskette according to claim 13, wherein said carded web of fibers and polymeric sheet are calendered between solid and engraved calender rolls.

17. A computer diskette according to claim 13, wherein said fibers are polyester.

18. A computer diskette liner according to claim 13, wherein said polymeric sheet is selected from the group consisting of polyester and polyolefinic based films.

19. A computer diskette according to claim 13, wherein said second melting temperature is equal to said first melting temperature.

* * * * *